Sept. 10, 1963 A. E. WILLIAMS 3,103,439
DEHYDRATION PROCESS AND PRODUCT
Filed Feb. 27, 1961
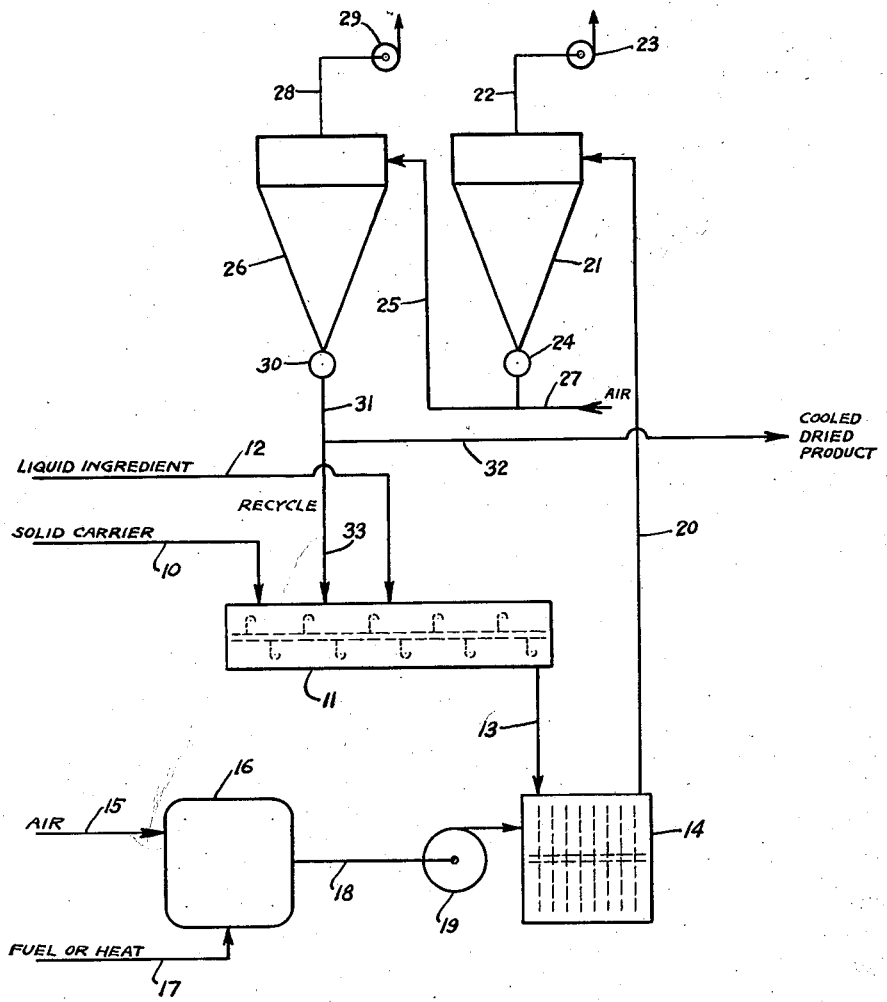
INVENTOR.
ALFRED E. WILLIAMS
BY George W. Porter
ATTORNEY United States Patent Office 3,103,439
Patented Sept. 10, 1963

3,103,439
DEHYDRATION PROCESS AND PRODUCT
Alfred E. Williams, Minneapolis, Minn., assignor to The Pillsbury Company, Minneapolis, Minn., a corporation of Delaware
Filed Feb. 27, 1961, Ser. No. 91,784
12 Claims. (Cl. 99—199)

This invention relates to the dehydration of heat sensitive liquid materials which are difficult or impossible to satisfactorily dehydrate by conventional drying methods. At the same time the invention relates to the incorporation of heat sensitive liquid materials, which are ordinarily difficult to dehydrate, into dry mixes. As an example by the method of this invention, liquid ingredients such as molasses, honey, corn syrup, invert sugar syrup, pulped fruit and fruit juices and the like can be incorporated into dry mixes, such as premixes for bakery products, such as cakes, gingerbreads, cookies, biscuits, muffins, pancakes and the like, and animal feed mixes and the like, by drying the liquid ingredient while sorbed on a finely divided carrier, such grain fractions as flour, starch, bran, middlings and the like.

Molasses, honey, corn syrup, invert sugar syrup pulped fruit, and fruit juices are exemplary of heat sensitive materials which are difficult to dry satisfactorily by conventional drying methods. This invention and the problems which it overcomes will be described with particular reference to molasses, but it is to be understood that the invention is not limited to molasses. Its principles are equally applicable to other similar heat sensitive liquid materials.

It is common practice to incorporate such materials as molasses, honey, syrups, fruit pulp and the like in premixes for bakery products for flavoring and for sweetening. Materials such as molasses are incorporated into animal feeds for their own nutrient value, but particularly to improve the palatability of the feed. One of the principal problems in preparing dry mixes containing liquid ingredients has been the conversion of the liquid material into a solid without adversely affecting the characteristics for which it is added and the characteristics and qualities of the final product.

Heretofore, liquid ingredients such as molasses, honey, syrups and the like have been incorporated into prepared, dry premixes for bakery products and the like in several different ways. According to one method the liquid material is completely dried and ground to a fine powder which is subsequently blended into a flour mix. Molasses dried in this manner is difficult to handle because it is extremely hygroscopic and continues to exhibit hygroscopic properties after admixed with flour. The result is often a sticky or doughy or gummy mass. The molasses may be dried by spray, drum or kettle drying, usually to a moisture content of 2% or less. However, drying in this manner is extremely difficult where it is desired to preserve the flavor characteristics of the molasses or syrup.

Another method of incorporating such liquid materials into prepared mixes is to emulsify the liquid with shortening and dry the emulsion to a form capable of being powdered. The dry emulsion is then ground and mixed with other dry ingredients. According to still another method, the heat sensitive liquid ingredient is blended into flour to form a dough. This is subsequently dried and ground. Both the emulsion and the dough are extremely difficult to dry. Low temperatures must be maintained. This necessitates the use of long time periods, or vacuum equipment, or both.

According to a still further method, flour is dried to a moisture content not substantially in excess of 7% and the heat sensitive liquid material is separately concentrated to a moisture content within the range of 4% to 10%. The concentrated liquid and the dried flour are then mixed to thoroughly incorporate the liquid ingredient in the flour. This method has the disadvantage of requiring the predrying of the flour and preconcentration of the liquid. The resulting mixture is often lacking in uniformity and homogeneity and is difficult to handle.

It has now been discovered that heat sensitive liquid materials can be dried and a more uniform, more free-flowing and more homogeneous dry mix can be prepared by incorporating the liquid ingredients directly into a dry carrier under controlled conditions and subsequently flash drying the mixture while maintaining it dispersed under agitation. In the case of prepared premixes for bakery products, a superior baked product results. The process of this invention utilizes a turbulent high temperature drying gas at high velocity. Higher temperatures than heretofore thought possible can be used without fear either of gelatinization of the starch or degradation of the protein in the mix and without degradation of the desirable qualities and characteristics of the heat sensitive liquid material.

The process of this invention is of utility and interest in the preparation of prepared mixes for bakery products, for the preparation of specialized ingredients for use in making bakery products, for the incorporation of liquid ingredients into animal feeds and the incorporation of heat sensitive liquid ingredients into dry, finely divided solid mixes of all kinds.

The principal object of this invention, therefore, is to provide a novel and inventive process for the dehydration of heat sensitive liquid materials, which are difficult or impossible to dry by conventional means, by application to a solid carrier and flash drying in situ.

Another object of this invention is to provide a novel and inventive process for the incorporation of liquid heat sensitive ingredients into dry finely divided solid mixes to produce a uniform free-flowing homogeneous product.

It is a still further object of this invention to provide a novel and inventive process for the incorporation of liquid heat sensitive materials into dry prepared mixes for bakery products and animal feeds and the like.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated schematically in flow sheet form in the single FIGURE of the drawing.

The dry solid carrier portion of the dry mix is fed at a controllable rate from a source of supply along a path, indicated schematically at numeral 10, to the upstream end of a continuous agitating mixer 11. The liquid ingredient is fed in controllable amounts from a liquid source of supply, along a path indicated schematically at 12, to the mixer at a point somewhat downstream from the point of entry of the solid carrier. The liquid ingredient and the dry solid carrier are fed in proportions depending upon the desired final product analysis and upon the moisture contents of the ingredients, as explained in greater detail hereinafter.

The mixer is desirably of the tandem or pug type disposed generally horizontally and equipped with one or more longitudinally extending rotatable shafts fitted with paddles or blades or similar agitating means. A preferred mixer agitator is in the form of hooks shaped from metal rod material extending out from the mixer shaft. The mixing is accomplished by rotating the mixer shafts at relatively high velocities such as, for example, from about 300 to 1,000 r.p.m. Alternatively, other agitating mixing equipment such as a ribbon blender, tumbling blender or a high speed turbulizer may be used to mix the liquid and solid components.

The moisture content of the liquid-solid mixture may vary depending upon the characteristics of the materials which are admixed. When molasses is the liquid and flour is the carrier the combined moisture content of the ingredients in the mixer must be maintained between about 8 to 10% to not substantially over about 14 to 15% in order to prevent pilling or agglomeration of the material in the mixer. When bran is the carrier the total moisture content may be in the range 20 to 25%. When banana pulp is the liquid material total moisture up to 20 to 25% may likewise be tolerated. Depending upon the particular materials comprising the mixture it may be necessary to condition the feed by recycling a portion of the dried product to maintain the necessary moisture content in the mixer. Recycling also permits production of a product having a high proportion of solids from the liquid material. These expedients are explained in greater detail below.

The solid carrier is introduced to the mixer ahead of the liquid ingredient to insure that the carrier is in an agitated and somewhat dispersed state when it is first contacted by the liquid material. The liquid ingredient is desirably introduced in a dispersed state, as by spraying, although this is not essential. In the case of a material like molasses, it may be heated to facilitate flow. The finely divided solid carrier presents a tremendous surface area upon which the liquid may be sorbed. The liquid becomes admixed with the carrier by being spread under influence of the high speed agitating mixer and sorbed in the surface of the particles of the carrier. The result is that the mixture as formed in the mixer remains a flowable dry appearing mass of discrete particles which flow along the path, indicated schematically at 13, from the downstream end of the mixer directly into an agitating drying mill 14.

The principal function of the mill 14 is to maintain the mixture of solid carrier and liquid ingredient in a highly dispersed state while it is subjected to contact with a turbulent blast of hot drying gas. Thus, the mill functions as a flash drier. It functions to reduce any agglomerated masses of the liquid and carrier which might have been accidentally formed in the mixer. The mill also produces a smearing action. Any droplets of liquid material remaining on the surface of carrier are leveled or smeared over a greater area to increase sorption of the liquid.

A variety of forms of agitating mill may be used for this purpose. Exemplary mills include the vertical mills, "Imp" mills, and cage mills, sold by the Raymond Division of Combustion Engineering, Inc., of Chicago, Illinois. Another mill which may be used is the Hurricane mill of the type exemplified by United States Patent No. 2,440,285 and other Lykken patents. These mills are operated under conditions to maintain the particulate material dispersed and entrained in the turbulent gas stream and any reducing or pulverizing function is incidental to this primary purpose.

Air or other drying gas is introduced along a path, indicated schematically at 15, to an air heater 16 for direct or indirect heating. The heater is supplied along the path, indicated schematically at 17, with heat, such as steam heat, for indirect heating of the drying gas, or fuel, such as natural gas, oil, pulverized coal or the like, which is burned to raise the temperature of the drying gas by direct heating. This heated air or other hot drying gas is conveyed along a path, indicated schematically at 18, to the agitating mill 14. The hot gas is conveyed by means of a separate fan or blower 19, or by means of an equivalent fan or blower means which is integral with the mill.

The mill agitator maintains great turbulence in the mill. The contact of the solid carrier particles with their sorbed liquid material with the turbulent hot gas stream results in an almost instantaneous drying of the liquid material and of the solid carrier to produce a dry particle incorporating the dried former liquid material. This dried material is quickly passed through the agitating mill entrained in the relatively high velocity gas stream and is expelled along a path, indicated schematically at 20, to a gas separator in the form of a cyclone separator 21.

The carrier gas, along with water vapor and any other gases released from the dried product, is vented from the top of the gas separator through a duct 22. Venting and expulsion of the carrier gas is desirably assisted by means of a small auxiliary fan or blower 23. The dried product flows by gravity flow to the bottom of the separator and is withdrawn through an air lock 24 for transport through a conduit, indicated schematically at 25, to a second cooling cyclone 26. Cooling air is introduced through an inlet indicated at 27 to convey and cool the dried product.

The dried product is separated from the cooling gas in the cooling cyclone or gas separator 26. The cooling gas is vented from the top of the gas separator 26 through a vent or duct 28 and, optionally, is expelled by auxiliary fan or blower 29. The cooled dried product is withdrawn from the separator 26 through an air lock 30 to a product duct 31. The cooled, dried product is discharged through a duct indicated schematically at 32 for further cooling, if necessary, or storage, or packaging, or use.

In many instances, it is desirable to recycle a fraction of the cooled dried product back to the mixer in order to condition the feed from the mixer to the agitator at the desired low moisture content level or to increase the solids content of the liquid material in the final product. The recycled product is introduced to the mixer 11 upstream from the point of introduction of the liquid ingredient in order that the virgin solid carrier and the recycle product, which now also functions as a solid carrier, may be intimately and homogeneously admixed. Feed may be conditioned, for example, as follows. When molasses is being dried on a flour carrier, the molasses may have an initial moisture content of about 30% and the flour an initial moisture content of about 12%. In contrast, the dried product may have a final moisture content of only about 3%. These three ingredients are introduced to the mixer in such proportions that the moisture level of the resulting mixture is not higher than the critical 14 to 15% limit. This is illustrated in Example 1. By recycling a higher percentage of the dried product a greater amount of liquid material is sorbed on the product, so that when redried the final product has a higher proportion of solids from the liquid material. This is illustrated in Example 3.

To minimize stickiness in the mixer, it is preferably operated under relatively cool temperature conditions, that is, under about 120 to 130° F. It is primarily for this purpose that the product is cooled before recycling a fraction of it to the mixer. Where none of the product is to be recycled the product from the drier mill 14 may be conveyed directly to the gas separator 26 and the final dried product may then be conveyed through conduits 31 and 32 for further cooling by any conventional cooling means. Some cooling of the carrier gas occurs in the drier mill itself where the evaporation of moisture from the liquid containing carrier particles produces a cooling effect. This aids in avoiding over-heating of the particles.

Although molasses dried by conventional drying methods is extremely hygroscopic, the dried molasses-flour product of the present invention surprisingly is non-hygroscopic. However, when the product is used in a premix for bakery products, it readily absorbs the liquids added in the preparation of the bakery products. Bakery product premixes containing the dried molasses-flour product as an ingredient exhibit improved baking qualities over the use of spray or drum dried material or mixtures of dried doughs. The cake or other bakery product is characterized by an increase in volume while maintaining a fine and uniform texture. At the same time, the shelf life or keeping qualities of the mixes are greatly improved due to overall reduced moisture content of the mix.

Because of the uniformity of the product, mix quality and performance are more easily controlled. The product is more easily handled because of the decrease in hygroscopic properties, the decreased tendency to cake and the smaller more uniform particle size. Degradation due to time and temperature conditions are avoided. Although relatively high temperatures are employed, the time of exposure of the feed mixture is so short and the moisture content of the mixture is held so low that starch gelatinization is avoided. At the same time, heat degradation of protein is avoided.

The desirable qualities and characteristics of the molasses or honey or syrup or similar heat sensitive materials are preserved. Extremely heat sensitive liquid material such as pulped bananas can be dried by this method while preserving the flavor characteristics of the material. In addition to the advantages of an improved product, the present dehydration method provides an economical means of incorporating liquid ingredients into dry mixes.

Although drying according to the present method can be accomplished at relatively low temperatures, the system functions more efficiently at temperatures over 250° F. and preferably at temperatures in the range of about 500 to 600° F. The amount of air used is dependent upon the amount of moisture to be removed and the weight and density of the particles. Sufficient air is required to lift and move out the product entrained in the air stream and sufficient heat is required to dry the product almost instantaneously.

In general, the solid particulate material from the mixer will be entrained in air in the agitator in the proportion of about 0.05 to about 0.30 lb. of solid per pound of bone dry air. The greater proportion of solids may be present at the higher operating temperatures, and vice versa. Air velocities of from about 35 up to about 200 feet per second may be employed, but, preferably, the air is moving at the rate of about 65 to 80 feet per second.

For bakery product premixes the carrier solid is a functional part of the final product. Thus, flour or starch or similar granular material which will retain water or the liquid ingredient by a sorption process, and which will contribute to the final product, may be used as a carrier. For other purposes, materials which are inert, that is, nonfunctional in the final product, which do not adversely effect product quality, may be used.

The recycled dried product resulting from dehydration of the liquid ingredient may be used as the carrier to increase concentration of the liquid ingredient. The concentration of liquid ingredient in the final product can also be increased by recycling larger proportions of the dried product from the gas separator.

The process of the present invention offers a means by which liquid materials which cannot be easily and satisfactorily dried by conventional methods may be dried and, at the same time, incorporated into dry mixes.

The invention is further illustrated by the following examples, which are exemplary of typical operating conditions but do not impose limitations on the invention.

*Example 1*

A final product composed of non-hygroscopic granular particles of average particle size between about 500 and 700 microns and containing 67% flour, 30% molasses, and 3% moisture is produced as follows: Flour having a moisture content of about 12% is fed at the rate of 76.2 parts by weight per unit of time for each 100 parts of final product to a pug mill mixer (Eureka Standard Duplex) operated at a shaft speed of 350 r.p.m. Dried recycle product having a moisture content of about 3% is fed to the mixer at the rate of about 48.7 parts by weight. The flour and recycle product are intimately and uniformly admixed. The mixture has a moisture content of about 8.5%. To this mixture, in the mixer, molasses having a moisture content of about 30%, is fed at the rate of 42.8 parts by weight. The molasses is heated slightly to facilitate its flow and is sprayed into the dry ingredients in the mixer while subject to turbulent mixing action. The molasses material is sorbed by the dry particles and the mass maintains its particulate free-flowing form. This final mixture has a moisture content of about 14% and is fed at the rate of 167.7 parts by weight to an agitating drying mill (Raymond No. 50 "Imp" mill). At the same time, air is heated and supplied to the mill at the rate of about 1443 parts by weight of bone dry air to give a ratio of about 0.1 part of solids per part of bone dry air. The air temperature is about 500° F. and the air velocity is about 70 feet per second. The flour-molasses product is dried virtually instantaneously in the hot turbulent air stream. The flashing of moisture from the product reduces the temperature of the carrier gas so that the product leaves the mill at a temperature of about 240° F. This dried material is conveyed at the rate of about 148.7 parts by weight to a cyclone separator and upon its discharge from the separator has a temperature of about 180–190° F. By passing the product through a second cyclone separator the temperature of the dried product is reduced to about 120–130° F. This product is split to recycle a fraction to the mixer at the rate of about 48.7 parts by weight. The remaining product, in the amount of about 100 parts by weight, is ready for incorporation as an ingredient of a bakery product premix or other uses as desired. The product is in the form of a particle of ungelatinized flour permeated with dried molasses.

*Example 2*

Flour of about 12% moisture content and blackstrap molasses having a moisture content of about 28% are mixed in the proportion of about 30 pounds of molasses to each 100 pounds of flour in a ribbon blender. This mixture is dried instantaneously in a turbulent stream of hot air at 320° F. in a vertical mill (18" Raymond Vertical Mill, 20 hp., 7000 r.p.m.). The dried material is cooled and, on a dry basis, contains about 80% of flour solids and 20% of molasses solids. A mixture containing 30% molasses solids and 70% of flour solids, on a dry basis, is then prepared by adding molasses in the proportion of about 21.2 pounds for each 100 pounds of the previous dried product, thoroughly admixing and drying in the hot turbulent air stream and finally cooling.

*Example 3*

A dry mix containing about 30% molasses solids and about 70% of flour solids on a dry basis is obtained directly by an alternative procedure by which 28% moisture blackstrap molasses is mixed with flour having about 12% moisture in the proportion of about 52 pounds of molasses for each 100 pounds of flour, plus about 31 pounds of recycled dry product. The recycled product contains the desired proportions of flour and molasses on a dry basis and only about 3% moisture. The mixture of flour, molasses and recycled product in these proportions produces a mixture for introduction to the drying mill having a moisture content of about 15%. It is flash dried in the turbulent hot gas stream and cooled. The required fraction of the final product is recycled to the mixer.

*Example 4*

A dry animal feed product having 50% of molasses solids on a dry basis was prepared by admixing 53.4 parts by weight of wheat bran and about 6.4% moisture and 71.5 parts by weight of 70% solids molasses in an agitating mixer. This mixture, which had a total moisture content of 19.9% was then dried in a turbulent hot air stream at a temperature of about 350° F. The dried product was cooled and none was recycled to the mixer.

*Example 5*

Banana is an extremely heat sensitive material. The sugars in banana are readily converted to starch under influence of heat so that banana, dried according to conventional methods, loses virtually all of its desirable flavoring characteristics. Yet, banana has been successfully dried and admixed with flour according to the present method. Banana when pulped contains about 75% water. A banana-flour mixture containing about 20% banana solids has been prepared by mixing flour having 12% moisture with banana pulp having about 75% moisture and a dried banana-flour recycle product having about 3% moisture in the proportion of 76.1 parts by weight of flour, 80 parts by weight of banana pulp and 223 parts by weight of the dried recycle product. The moisture content of the resulting mixture as fed to the drying mill is about 20%. This mixture is flash dried instantaneously in the mill by contact with the turbulent hot air at a temperature of about 500° F. with little or no deleterious effect upon the flavor characteristics of the banana. The product is cooled and a large fraction is recycled. By recycling a larger percentage of the product, the banana content of the final product can be substantially increased. The resulting product is a particle of ungelatinized flour permeated with dried banana solids. The product is comparable in banana solids to the original banana in which the original water has been replaced by flour.

*Example 6*

The manner in which use of the recycle product may be used to increase in the final product the solid content of the liquid ingredient is illustrated in this example in which banana was dried on a flour carrier in three passes through a batch drier system. The initial feed was in the proportion of 20 parts by weight of banana containing 76.92% water and 62.5 parts by weight of flour containing 9% moisture. The moisture content of the mixture was 25.5%. The air inlet temperature was 520° F. and the drying gas was vented at 203° F. The initial product consisted of banana solids in the amount of 7.16% flour solids in the amount of 88.54% and 4.3% moisture. To increase the proportion of banana solids, this initial product was recycled in the proportion of 60 pounds to 25 pounds of banana liquid. This mixture had a moisture content of 25.9%. The gas inlet temperature for this second pass through the apparatus was 600° F. and the drying gas was vented at 180° F. The resulting product consisted of 15.3% banana solids, 80.7% flour solids and 4% moisture. Then 39 parts by weight of this product was recycled along with 8.4 parts by weight of banana liquid. The moisture content of the mixture was 16.8%. These proportions were chosen because it was desired to produce a final product containing about 20% banana solids. A greater proportion of banana liquid could have been used in amount to bring the moisture content of the mixture up to about 25%. For this third pass the air inlet temperature was 470° F. and the gas outlet temperature was 192° F. The final dried product consisted of 19.35% banana solids, 77.1% flour solids and 3.55% water.

*Example 7*

Corn syrup was dried on a flour carrier in a Raymond mill. Corn syrup containing 19% water was mixed in the proportion of 33.7 parts by weight with 60 parts by weight of flour of 9% moisture content. The moisture content of the mixture was 12.6%. The air inlet temperature was 310° F. and the drying gas was vented at 236 to 250° F. The dried product contained corn syrup solids in the proportion of 32.7%, flour solids in the amount of 65.5% and water in the amount of 1.8%.

*Example 8*

Honey was similarly dried on a flour carrier. A relatively high viscosity honey containing 18.14% moisture was admixed in the proportion of 26 parts by weight with 74 parts by weight of flour containing 12.2% water. The moisture content of this mixture was 13.75%. The air inlet temperature was 315° F. and the drying gas was vented at 270° F. The product consisted of 24.3% honey solids, 74.3% flour solids and 1.4% water.

*Example 9*

Molasses was also dried on a starch carrier. Molasses containing 30% moisture was admixed in the proportion of 11.4 parts by weight with 30 parts by weight of wheat starch containing 10% moisture. The moisture content of this feed mixture was 13.1%. The air inlet temperature was 300° F. and the drying gas was vented at 192° F.

*Example 10*

Invert syrup was dried on a flour carrier. Invert syrup containing 21% water was admixed in the proportion of 39.4 parts by weight with 100 parts by weight of flour containing 10% water. The moisture content of the feed mixture was 13.1%. The drying gas inlet temperature was 420° F. and the drying gas was vented at 204° F. The product was recovered in the amount of 125 parts by weight and contained 3.1% water.

In each instance where the process of this invention has been carried out, there is obtained a dry non-hygroscopic finely divided granular product. The product is easily handled and gives a superior performance when incorporated as an ingredient in baked goods. When used to admix liquid products into animal feeds, for example, substantially higher proportions of the liquid ingredient can be added than was heretofore thought possible using conventional means.

The relative proportions of liquid ingredients and dry solid carrier initially admixed will depend to a large degree upon the desired analysis of the final product, the moisture contents of the materials and the sorptive properties of the carrier. These factors will also dictate whether a fraction of the dried product should be recycled and, if so, in what proportion. The moisture content of the final dried product is also largely dependent upon the desired characteristics of that product. In most instances, however, the final dried product will have a moisture content between about 2 to 4% although products having lower moisture levels can be made by use of the drying method of this invention.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of dehydrating heat sensitive liquid materials which are difficult to dry by conventional methods without loss of desirable qualities and incorporating into dry mixes, which method comprises vigorously admixing the liquid material with a solid finely divided carrier, without overheating said liquid material and said carrier, to distribute the liquid material for sorption by the carrier without substantial agglomeration of the materials, subjecting the admixed materials to a hot drying gas while simultaneously subjecting the materials to vigorous agitation to remove moisture from the materials, and thereafter separating the dried product from the gas and cooling.

2. A method according to claim 1 further characterized in that said liquid material is selected from the class consisting of molasses, honey, sugar syrups, corn syrup, fruit pulp and fruit juices and said finely divided solid carrier is selected from the class consisting of grain fractions and starch.

3. A method according to claim 2 further characterized in that said liquid material and solid carrier are admixed in proportions depending upon the moisture contents of the materials such that the moisture content of the mixture does not substantially exceed about 15% to 25%.

4. A method according to claim 1 further characterized in that said mixture of liquid material and solid carrier is contacted with hot gas at a temperature of about 250° F. to 600° F. while moving at a velocity between about 35 and 200 feet per second in the proportion of about 0.05 to 0.30 pound of carrier and liquid to each pound of dry air.

5. A method according to claim 1 further characterized in that a fraction of the dried cooled product is recycled for admixture with said liquid material and solid carrier to increase the solids content of the dried material.

6. A method of making a dehydrated bakery product ingredient which comprises vigorously admixing molasses with wheat flour, as a carrier, to distribute the molasses over the surface of the flour without substantial agglomeration or overheating of the materials, subjecting the admixed molasses and flour to hot air at a temperature between about 500° to 600° F. while moving at a velocity between about 65 to 80 feet per second while simultaneously subjecting the material to vigorous agitation to remove the moisture therefrom, said molasses and flour mixture being present in the proportion of about 0.5 to 0.30 pound per pound of dry air, thereafter separating the dried product from the air and cooling, the cooled dried product having a moisture content between about 2% and 4%, and recycling a fraction of the dried cooled product for admixing with molasses and flour in a proportion such that the moisture content of the mixture does not substantially exceed about 15%.

7. A method of making a dehydrated ingredient for bakery products which comprises vigorously admixing banana pulp with wheat flour, as a carrier, to distribute the banana over the surface of the flour without substantial agglomeration or overheating of the materials, subjecting the admixed materials to hot air at a temperature between about 500° and 600° F. and at a velocity between about 65 and 80 feet per second while simultaneously subjecting the materials to vigorous agitation to remove moisture from the material, said banana solids and flour being present in the amount of from about 0.05 to 0.30 pound per pound of dry air, thereafter separating the dried product from the gas and cooling, the dried cooled product having a moisture content between about 2% and 4%, recycling a fraction of the cooled dried product for admixture with the banana pulp and flour carrier in a proportion such that the moisture content of the admixed banana pulp, flour carrier and recycled product does not substantially exceed about 20 to 25%.

8. A method of dehydrating heat sensitive liquid materials which are difficult to dry by conventional methods without loss of desirable qualities and incorporating into dry mixes, which method comprises vigorously admixing a liquid material selected from the class consisting of molasses, honey, sugar syrup, corn syrup, fruit pulp and fruit juices with a finely divided solid carrier having a liquid sorbable surface selected from the class consisting of grain fractions and starch to distribute the liquid material for sorption by the carrier without substantial agglomeration or overheating of the materials, said liquid material and solid carrier being admixed in proportions depending upon the moisture contents of the materials such that the moisture content of the mixture does not substantially exceed about 15 to 25%, subjecting the admixed material to a hot drying gas while simultaneously subjecting the materials to vigorous agitation to remove moisture from the materials by contacting the mixture with a hot gas at a temperature of about 250° F. to 600° F. while moving at a velocity between about 35 and 200 feet per second in the proportion of about 0.05 to 0.30 pound of carrier and liquid to each pound of dry air, and thereafter separating the dried product from the gas and cooling.

9. A method according to claim 8 further characterized in that a fraction of the dried cooled product is recycled for admixture with said liquid material and solid carrier to increase the solids content of the dried material.

10. The product produced by the method of claim 1.

11. The product produced by the method of claim 6.

12. The product produced by the method of claim 8.

References Cited in the file of this patent

UNITED STATES PATENTS

| | | |
|---|---|---|
| 1,995,519 | Reiner | Mar. 26, 1935 |
| 2,192,273 | Rey | Mar. 5, 1940 |
| 2,430,797 | Zenzes | Nov. 11, 1947 |
| 2,707,151 | Martin | Apr. 26, 1955 |